Feb. 15, 1927. 1,618,123
W. EDWARDS
SELF OILING PULLEY
Filed Feb. 12, 1926
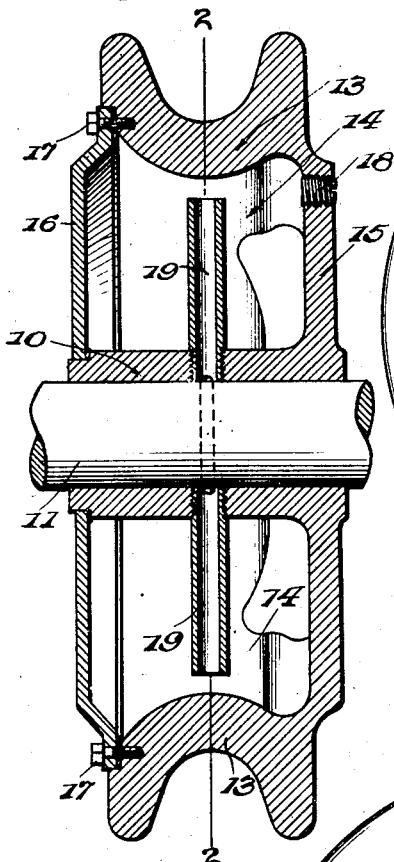
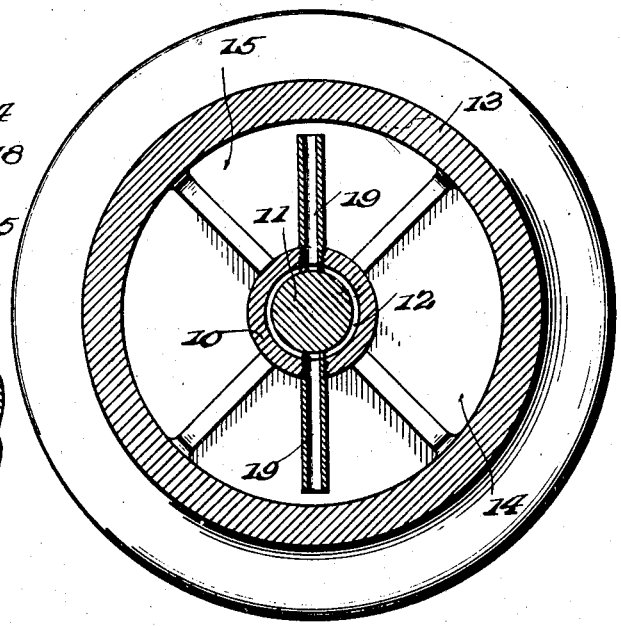
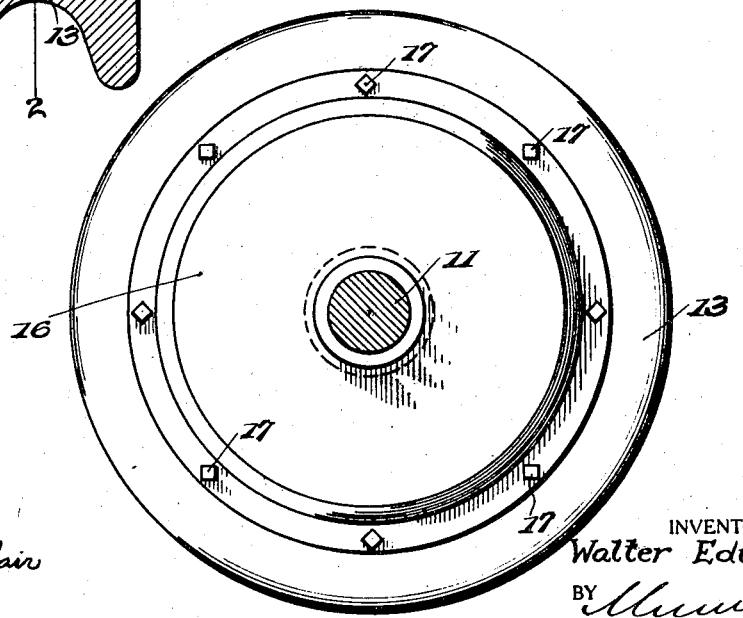
WITNESSES
H. A. LaBlair
Myron G. Olean
INVENTOR
Walter Edwards
BY
ATTORNEYS Patented Feb. 15, 1927.

1,618,123

UNITED STATES PATENT OFFICE.

WALTER EDWARDS, OF TERRE HAUTE, INDIANA, ASSIGNOR OF FORTY-NINE PER CENT TO WILLIAM B. EDMONDS, OF TERRE HAUTE, INDIANA.

SELF-OILING PULLEY.

Application filed February 12, 1926. Serial No. 87,916.

My present invention relates generally to pulleys, trolley wheels, and other journaled rotating elements of this character, and more particularly to self oiling arrangements therefor, my object being the provision of a simple, inexpensive construction which will be effective and efficient in use for the purposes for which it is provided, and which utilizes a construction of a strong, durable character.

In the accompanying drawing which illustrates my invention and forms part of this specification:—

Figure 1 is a sectional view taken diametrically through my invention, showing its practical application in connection with a trolley wheel.

Figure 2 is a median section taken substantially on line 2—2 of Fig. 1, and,

Figure 3 is a side view thereof.

Referring now to these figures, my invention proposes an arrangement in connection with a trolley wheel pulley and the like having a central hub portion 10 journaled upon a shaft and the like 11, and provided centrally thereof with an annular groove 12, around the shaft with which the inner ends of a pair of diametrical openings communicate.

The pulley or wheel is further formed with an outer flange 13 and has between its hub 10 and its flange 13 an enlarged oil chamber 14, defined by a rigid side wall 15, and a removable side wall 16, the latter preferably secured in place by machine screws 17 and confined in connection with gaskets adapted to prevent leakage of oil from the chamber 14.

The rigid wall 15 is preferably provided with an opening for the replenishment of oil within the chamber 14, the opening being normally closed by a screw closure 18, and the chamber 14 is preferably entirely open to the inner ends of the diametrical openings of the hub 10 and open to the outer ends of a pair of rigid feed tubes 19, whose inner ends are threaded into the diametrical openings of the hub 10, these feed tubes extending radially into the chamber 14 and terminating at their outer ends adjacent to and spaced from the inner surface of the rim 13.

Thus with oil in the chamber 14, a certain proportion of this oil which in the rotating movement of the pulley as a whole, is thrown by centrifugal action against the inner surface of the rim 13, finds its way into the outer ends of the tubes 19, whenever motion of the wheel or pulley ceases, and the oil which thus feeds to the groove 12 of the hub around the shaft 11 is sufficient in practice to keep the journal of the wheel in a thoroughly lubricated condition at all times.

This arrangement is especially useful in connection with trolley wheels and other rotating members, which in practice are subjected to frequent stops, although it is to be understood that while illustrating my invention in connection with a trolley wheel, it is not to be limited to such use, but may be effectively and efficiently employed in connection with pulleys, and in fact all rotating elements of this general character having journals upon supporting shafts.

The construction as outlined for the carrying out of my invention is both strong and durable, and yet the device as a whole is of a very economical nature, but little more expensive than the ordinary wheel, while its use is obviously the means of saving a great deal of wear and tear in operation and the losses due to delays ordinarily required by the repair and substitution of the rapidly wearing machine elements of this type.

I claim:—

In an automatically oiled pulley, an integral rim side wall and bearing portion, said rim being formed with an inner convexed side, apertures in said bearing portion, a portion having a circumferential groove disposed adjacent the apertures in said bearing portion, tubular members mounted in said apertures in the bearing portions of the pulley having their ends open opposite to the openings in said bearing portion and closely adjacent to the inner convexed side of the rim of the pulley, whereby the amount of oil passing into said tubular members is limited by the space between the ends of the tubular members and the inner convexed side of the pulley rim, and a second detachable side plate adapted to engage the side of the pulley rim and the bearing portion of the pulley to form an oil reservoir within the pulley.

WALTER EDWARDS.